United States Patent Office 2,779,846
Patented Jan. 29, 1957

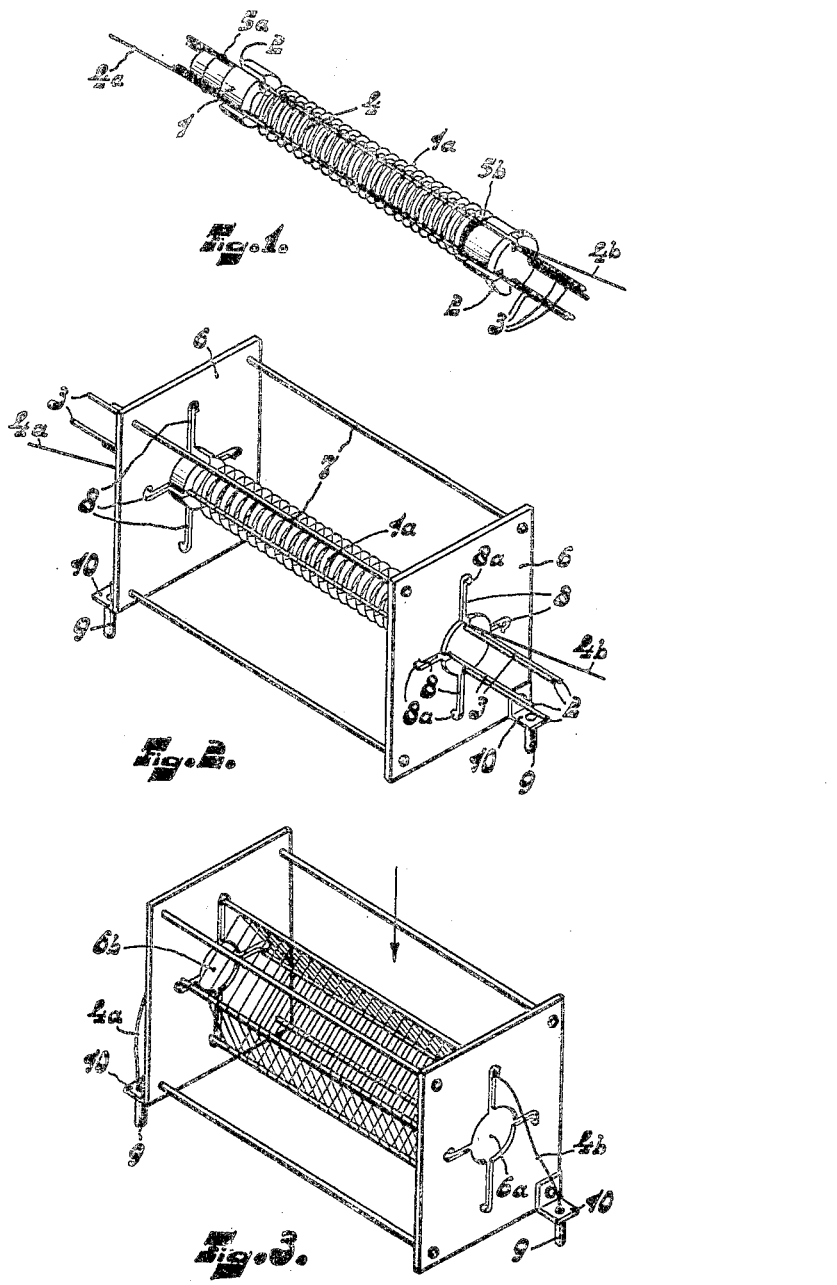

2,779,846

TEMPERATURE SENSITIVE ELEMENT

John Howard Richards, Reigate, England, assignor to Hartford National Bank and Trust Company, Hartford, Conn., as trustee Application June 9, 1954, Serial No. 435,583

Claims priority, application Great Britain June 11, 1953

4 Claims. (Cl. 201—63)

This invention relates to an improved temperature measuring element and has a particular application to measurement of temperature in the upper air by radar and radio sonde systems.

It is current practice in such systems to cause the signal transmitted by the sonde to be controlled in some way by a temperature sensitive element. Examples of such elements are (a) bimetallic units whose physical dimensions are a function of temperature, and which are used to vary the inductance or capacitance of a tuned circuit thereby varying the frequency and (b) resistors, constructed of a semi conducting material, whose resistance varies with temperature and which are used to control the frequency of an oscillator or the pulse width of a pulse generating circuit.

Disadvantages of the bimetallic elements are:
1. Appreciable time lags to changes in air temperature.
2. Comparatively large surface area giving rise to errors due to solar radiation.
3. Need for conversion of mechanical movement to an electrical parameter.

Disadvantages of the semiconducting resistance elements are:
1. Nonlinearity of the resistance temperature characteristic.
2. Variation of characteristics between elements.
3. Relative poor stability of elements with respect to wire resistors.

The use of a resistance wire while very suitable from the standpoint of stability and consistency, has hitherto been regarded as unfeasible since no way was known of winding a sufficiently high resistance except at a prohibitive cost due to the fragility and length of wire required.

It is the object of the present invention to overcome the above mentioned objections and difficulties.

The present invention makes use of a temperature sensitive element consisting of a coiled fine wire resistance such as filament wire used in electric lamp manufacture, which is supported at a plurality of points by being wound on supporting means in a frame, the wire ends subsequently being connected to a source of current supply.

Preferably the supporting means consists of electrically and thermally insulated rods which are secured in locating slots formed in end plates of the frame.

The method used in manufacturing the temperature sensitive element involves winding the coiled fine wire resistance, over rods supported on a jig which in turn is supported by end plates of a frame, separating the rods by moving them outwardly away from each other along locating slots formed in the end plates thus stretching the wire, removing the jig and securing the wire ends to terminals on the end plates.

In order that the invention may be more clearly understood the same will now be more particularly described with reference to the accompanying drawings in which:

Figure 1 shows a stage, in the development of the resistance element, which is preliminarily wound around a jig.

Figure 2 shows a further step in which the element and the jig are supported in a frame.

Figure 3 shows the finished element in the frame with the jig removed.

Referring to Figure 1, 1 is a jig, of substantially cylindrical shape, having a helical groove 1a formed thereon and having longitudinal slots 2 formed on its surface disposed transversely of the groove. Within these slots are laid support rods 3, these being temporarily held in position by means, such as rubber bands 5a, 5b.

Around the jig 1, and within the groove 1a is wound the coiled resistance wire 4, the ends of which are welded or otherwise fused to terminal leads 4a, 4b, projecting from slots 2 at opposite ends of the jig.

This coiled resistance wire may, preferably, be in the form of lamp filament wire, coiled in known manner about a mandrel so that the coiled wire can be safely handled. The mandrel is made from any suitable material, though preferably in the form of a metal wire, which can be dissolved by chemical means, such as acid, in known manner.

The winding jig, support rods and coiled wire is now immersed in the acid until the mandrel is completely dissolved. After neutralising, washing and drying, the winding jig is inserted in a main frame as shown in Figure 2.

This consists of end plates 6 joined together adjacent their corners by rods 7. In each end plate is an aperture 6a, 6b forming a snug fit for the ends of the jig 1, which is supported by the end plates.

Slots 8 are formed in each end plate, there being one slot for each support rod 3. These slots, form locating means for the support rods and at one end lead into the apertures 6a, 6b and from that point radiate outwardly and terminate, preferably in bayonet slots.

The jig 1 is positioned in the apertures 6a, 6b, so that the rods 3 lie adjacent the slots 8. The rods are then gripped at each end and moved parallel to, but away from the surface of the jig until they reach the ends of their respective slots 8. They are then moved into the bayonet ends of the slots and, preferably, cemented there.

During this latter operation the coils of the resistance wire 4 will have been stretched (see Figure 3) to an extent such that the convolutions are adequately spaced from each other and the wire is well tensioned.

The jig 1 is then removed and the ends of the supporting wires are trimmed and the lead wires 4a, 4b are soldered to terminals, which are preferably formed as plug pins 9, on mounts 10 provided on the end plates.

Advantages present in the device of the invention are that the method of support and the fact that a coiled wire is used result in the minimum contact with the frame support for a given length of wire thereby reducing errors due to the time lag of the frame support. A very fine stretched coiled wire of the type used has a very low time constant and radiation error. The method of construction is such that it is possible to construct a light weight temperature measuring element.

What is claimed is:

1. An electrical resistor comprising a pair of spaced end plates each having a central aperture and a plurality of substantially radially extending slots communicating with said aperture, a plurality of substantially parallel support rods each mounted in one slot of each end plate and secured therein, and a fine resistance wire wound about and supported on said rods.

2. A temperature-sensitive electrical resistor comprising a frame including a pair of spaced aligned end plates each having a central aperture and a plurality of substantially radially extending slots communicating with said aperture, the ends of said slots remote from said aperture having a receiving space, a plurality of substantially parallel electrically and thermally insulated rods each seated at its ends in the receiving space of a slot of each of the end plates and secured therein, a fine resistance wire wound tightly about and supported on said rods, and terminal means mounted on said end plates and connected to the ends of the resistance wire.

3. A method of manufacturing a resistance element mounted on supporting rods on end plates in a frame, comprising the steps of winding fine resistance wire about a plurality of said rods lying in slots within a jig, placing said jig with its rod-supported resistance wire within the frame in aligned apertures in said end plates, moving the rods outwardly away from the jig along slots in the end plates to positions wherein the resistance wire is stretched tightly, securing the rods to the end plates at said positions, and removing the jig from its position within the frame.

4. A method of manufacturing a temperature-sensitive resistance element mounted on insulated supporting rods on end plates in a frame, comprising the steps of winding coiled fine resistance wire, wound on a mandrel, about a plurality of said rods lying in slots in a cylindrical jig, chemically dissolving the mandrel, placing the jig within aligned apertures in the end plates, moving the rods radially outwardly along slots in the end plates to receiving spaces in the ends of the slots thereby securing the rods in position in the end plates, whereby the resistance wire is tightly stretched about said rods, removing the jig from the frame, and securing the ends of the resistance wire to terminals on the end plates.

References Cited in the file of this patent
UNITED STATES PATENTS

| | | |
|---|---|---|
| 1,976,522 | Rose | Oct. 9, 1934 |
| 2,428,003 | Beam et al. | Sept. 30, 1947 |
| 2,499,575 | Eddison et al. | Mar. 7, 1950 |
| 2,643,316 | Glassow | June 23, 1953 |